ically mentioned in the disclosure as now-
United States Patent
Stansbury et al.

[15] 3,643,450
[45] Feb. 22, 1972

[54] PROTECTING A BURIED MATERIAL SUCH AS A CABLE WITH WATER-SOLUBLE RODENT-REPELLENT COMPOSITIONS

[72] Inventors: Roy E. Stansbury; James A. Shotton, both of Bartlesville, Okla.

[73] Assignee: Phillips Petroleum Company

[22] Filed: Sept. 25, 1969

[21] Appl. No.: 861,175

[52] U.S. Cl.................................................61/72.1, 424/30
[51] Int. Cl..................................................................F16l 1/00
[58] Field of Search.....................61/72.1; 424/30; 47/48.5; 285/285; 138/178; 21/7; 252/91; 239/53; 71/3

[56] References Cited

UNITED STATES PATENTS

| | | | |
|---|---|---|---|
| 3,172,752 | 3/1965 | Pierce | 71/3 X |
| 1,971,390 | 8/1934 | Yahres | 47/48.5 |
| 2,449,731 | 9/1948 | Therrien | 285/285 |
| 3,232,007 | 2/1966 | Boatwright | 47/48.5 |
| 3,426,133 | 2/1969 | Shotton | 424/30 |
| 3,448,586 | 6/1969 | Mailen et al. | 61/72.1 |
| 3,503,800 | 3/1970 | Eddy | 61/72.1 X |

*Primary Examiner*—Jacob Shapiro
*Assistant Examiner*—David H. Corbin
*Attorney*—Young and Quigg

[57] ABSTRACT

A water-soluble rodent-repellent composition is coated onto a material, e.g., a cable, which is laid into the ground. Ground moisture dissolves the composition, forming in the earth surrounding the cable a rodent-repellent barrier thus preventing contact of the rodent with the cable or material. Any rodent repellent in a water-soluble or water-dispersible composition can be used. Specifically mentioned in the disclosure as now-preferred effective rodent repellents are N,N-dialkyl sulfenyl dithiocarbamates, e.g., the N,N-dimethylsulfenyl dithiocarbamates, N,N-dimethyl-S-methylsulfenyl dithiocarbamate and N,N-dimethyl-S-tert-butylsulfenyl dithiocarbamate.

7 Claims, No Drawings

PROTECTING A BURIED MATERIAL SUCH AS A CABLE WITH WATER-SOLUBLE RODENT-REPELLENT COMPOSITIONS

This invention relates to a method of protecting a buried material such as a cable or conduit against rodent damage. It also relates to the protected material, e.g., a cable or conduit protected against rodent damage.

In one of its concepts the invention provides protection for a buried material, as herein described, for example, an electric cable subject to damage by rodents, e.g., pocket gophers, by adding to or coating upon the cable a water-soluble or water dispersible rodent-repellent composition.

Buried materials such as cables have been protected from rodent damage by addition or incorporation to or in the outer surface of a cable. When the repellent is added to the surface of the cable, during its manufacture, some damage may, on occasion, be done by the rodent before the repellent drives him away. This is because the rodent must attack the cable to sense the repellent.

In U.S. Pat. No. 3,448,586, issued June 10, 1969, Tyson H. Mailen, there is described and claimed a method for protecting against rodent damage a rodent-damageable material which has been buried in the ground which comprises adding to the soil adjacent said material a material repellent to said rodent. In the patent are mentioned the rodent repellents which in this application are now preferred.

It has now been appreciated that in spite of the advantages of treating the soil to protect a buried cable or other material which is to be protected against rodent damage, upon occasion disadvantages exist. The cable often will not end up in the treated soil and/or the person treating the soil for some reason does not accomplish a proper treatment thereof, for example, skips an area due to malfunctioning of the treating machine or method. Other reasons for failure to properly treat the soil to protect completely the buried object will be understood by those in possession of this disclosure.

We have now discovered a method for treating the soil adjacent to a buried object, e.g., an electric cable, to be protected against rodent damage which comprises added to or coating upon the object the rodent-repellent material in a condition such that it will be dissolved or dispersed into the soil surrounding the object or cable, owing to a condition of the soil, for example, owing to moisture contained therein. We have conceived that a water-soluble or water-dispersible rodent-repellent composition can be coated upon the cable sometime prior to closing in the cable into the ground or trench. Shortly after burial the repellent is found to have permeated into the soil surrounding the buried cable forming a complete barrier preventing rodents from approaching close enough to the cable to gnaw thereon.

An object of this invention is to provide protection for a buried object to be protected against rodent damage. Another object of the invention is to protect a buried cable such as an electric cable or conduit against rodent damage. A further object of the invention is to so prepare an object to be buried in the ground that it will upon being in the ground a relatively short time release into the ground a rodent-repellent material forming a complete barrier around said object. A still further object of the invention is to so place into the ground surrounding a buried object or cable or conduit a rodent repellent that a rodent-repellent barrier will be formed in the ground in a manner such that the repellent barrier will be complete and will not have any places in it which a rodent will be able to traverse.

Other aspects, concepts and objects of the invention are apparent from a study of this disclosure and the appended claims.

According to the present invention there is provided a method for protecting a buried material such as an electric cable or conduit against pests or rodent damage which comprises placing upon the cable a water-dispersible composition containing a rodent repellent and then burying said cable in the ground so as to permit ground moisture to remove from the cable into the ground the composition in a manner to form a rodent-repellent barrier in the ground surrounding said cable, thereby preventing the rodent from coming into physical contact with the cable.

If the cable, conduit of buried object is being installed in a relatively arid section, it is within the scope of this invention to apply sufficient moisture to the trench and backfill surrounding the buried object to initiate and/or to complete the process of forming the repellent barrier.

Also, according to the present invention there is provided a protected object or cable or tubing to be placed in the ground and there to produce its own rodent-repellent barrier which comprises such an object coated with a rodent-repellent composition which will leave said object when in the ground due to moisture in the ground or applied thereto to form said barrier adjacent said object.

It will be appreciated by one skilled in the art in possession of this disclosure, having studied the same, that the compositions which can be applied to the object to be protected in the ground can be variously compounded. For best results certain criteria should be observed. The repellent should be long-lasting at the place at which it is to form the rodent-repellent barrier. Though it must not be readily washed away by ground waters, the composition should be such that it is reasonably quickly released from its position as a coating upon the cable or object so as to protect the object against early rodent attack.

The composition can be made up of soluble and insoluble discrete particles so that soluble particles release insoluble particles or amounts of permanently disposed repellent. Agents which aid in the dispersal or dissolution of the overall rodent-repellent composition thus causing it to migrate into the soil around the buried object or cable can be used. Essentially then a concept of the invention is in placing upon the object or cable a substantially complete coating of repellent composition of a character and in a manner such that the composition will release to render it effective against rodents a repellent barrier all around or surrounding the buried object or cable.

A rodent repellent which is now preferred is one described in U.S. Pat. No. 2,862,850, issued Dec. 2, 1958, Lyle D. Goodhue. The repellent there described is an N,N-dialkyl sulfenyl dithiocarbamate, more specifically, an N,N-dimethylsulfenyl dithiocarbamate, for example, N,N-dimethyl-S-methylsulfenyl dithiocarbamate and N,N-dimethyl-S-tert-butylsulfenyl dithiocarbamate.

The respective amounts of repellent and/or other ingredient in the composition to be placed upon the cable can be determined by routine testing.

Test have been made against gophers and have been shown to provide complete effective protection. In one test N,N-dimethyl-S-tert-butylsulfenyl dithiocarbamate was formulated so that it could be readily applied to a cable or structure and upon such application was normally dry and nontacky but when moist would slowly release the repellent to surround a treated object with a space repellent to rodent, i.e., a rodent-repellent barrier was formed. No injury to the treated object could occur because the object was, in effect, repellent to rodents at a distance. The rodents would not penetrate the barrier.

Thus, according to a concept of the invention the coating upon the cable will create its own volume of repellent space in the presence of moisture.

Water-soluble coating for buried cables are now preferred but it will be understood that composition which otherwise permeate the repellent into the soil to create the rodent-repellent barrier are within the scope of the claims.

The compositions used in the examples herein given are soluble emulsion coating compositions.

EXAMPLE

Formulation 1

| | | |
|---|---|---|
| Dimethylsulfoxide | 50 ml. | 82.7% by weight |
| N,N-dimethyl-S-tert-butylsulfenyl dithiocarbamate | 8 g. | 10.6% by weight |
| Polyvinylalcohol | 5 g. | 6.7% by weight |
| Total Weight | 75 g. | 100.0% |

Formulation 2

| | | |
|---|---|---|
| Dimethylsulfoxide | 50 ml. | 60.7% by weight |
| N,N-dimethyl-S-tert-butylsulfenyl dithiocarbamate | 32 g. | 34.0% by weight |
| Polyvinylalcohol | 5 g. | 5.3% by weight |
| Total Weight | 94 g. | 100.0% |

The above formulations were coated on a three-eighths-inch diameter Marlex (trademark) tubing. This diameter tubing is small enough in diameter so that it is not physically repellent to most gophers. Tests by the Denver Wildlife Research Laboratory have shown large diameter cables or tubing are themselves deterrent to gophers. The deterrent diameter falls somewhere between 1 and 2 inches in diameter. Both formulations were applied to the tubing in the same manner. The amount of tubing used in each test was weighed. The coatings were painted on the tubing and then dried in a stream of warm air. The tubing was again weighed to determine the increase in weight. This gave close approximation to the amount of chemical deposited on the tubing. Both formulations dried to a hard coating that could be handled. The coating itself average 0.7 grams per lineal foot. The amount of active ingredient per lineal foot of tubing was approximately 70 milligrams for Formulation 1 and 238 milligrams for Formulation 2. The latter formulation crystallized out at room temperatures. It required warming to a temperature above 90° to dissolve and apply to the tubing.

Laboratory Testing:

The test method used to evaluate these coatings was as follows: a case 30 inches wide, 30 inches high and 2¼ inches deep was used. It was constructed of wood except for one of the 30 × 30 sides which was of glass. This permitted the activity of the gopher to be observed at all times. This case was filled to within 5 inches of the top with sandy soil that was partially compacted. A gopher was introduced into the case. The gopher immediately set about sealing off any air inlets to the case. When this was complete, it started burrowing into the soil. It created tunnels in the soil and eventually worked its way to the bottom of the case. In the course of a 7-hour day, the gopher completed several trips digging from the top to the bottom and from the bottom to the top of the case.

When a repellent barrier is placed in the gopher's path of digging, he reacts in several ways:

1. If the barrier is soil according to the invention (2 pounds/mile rate), the gopher digs almost to the treated soil, it then plugs its burrow or tunnel and takes a course in another direction. This test cannot be continued indefinitely because the test case confines the gopher and the repellent treated soil in close quarters with each other. In tests run for 6 to 10 hours, the gophers eventually acted bewildered and did not know where to go.
2. If the barrier is a ladder arrangement made with ⅜ inch diameter tubing that is held 1⅛ inches apart by smaller polyethylene tubing, then the gophers will dig until they encounter the tubing. All gophers attempt to dig through these spaces; however, there are individual differences in gophers and some will work harder than others in their attempt to penetrate the barrier.

Seldom does a gopher penetrate the barrier in the 6 to 7 hours it is in the test chamber. The gophers will encounter the tubing of the ladder and cause damage by biting or chewing on the tubing in an effort to penetrate. This damage ranges from slight slashes that do not penetrate into the center of the tube, to large patches of the tubing being chewed away. Occasionally, a gopher will chew completely through a tube and penetrate the barrier.

Testing Coating of Formulation 1:

Ladder-type barriers were placed in the case in the same manner as the untreated tubing except that the soil next to the tubing was dampened and let stand for 24 hours, then a gopher was introduced into the test chamber. The soluble coating then was tested. The gopher dug until it came to within approximately 1 inch of the tubing. This was almost to the dampened soil. It then stopped digging, plugged its burrow and started digging in another direction. During the course of the day, the gopher encountered the dampened soil, now treated with repellent, a total of seven times. During a 6 hour period, the gopher never contacted the tubing itself. The gopher was removed and the soil in the case compacted. The lid of the case was left open so any vapors from the active ingredient could escape. The next day another gopher was introduced into the case and essentially the same performance was observed. The gopher never encountered the tubing itself. This gopher came in contact with the dampened soil five times during the day.

Testing coating of Formulation 2:

The tubing was arranged to form the usual barrier in the test case. As with the earlier test, the soil surrounding the tubing was dampened and let stand for 24 hours before a gopher was put in the case. Then a gopher was introduced into the case. The gopher encountered the first barrier in less than 30 minutes. The gopher dug to within 1½ inches of the tubing then stopped. It then plugged the tunnel and came to the top of the case. The gopher spent considerable time on top of the soil. The gopher again dug to the barrier and again returned to the top of the case.

Conclusion:

The two formulations of the water-soluble coating for underground cable or tubing were tested satisfactorily against gophers. These formulation prevented the gopher from encountering the tubing itself. Thus, no damage to the tubing occurred. The laboratory tests show that formulations such as tested are effective and can be employed to protect buried cables against rodents.

The following are some of the advantages for water soluble or dispersible coatings for buried objects or cables.

1. The coating (treatment) is made at the factory; thus, every foot of cable is treated and better controls over the application can be exercised.
2. The coating is applied to the outside of the cable; thus, it is readily available to be repellent. This is to be distinguished from incorporating the repellent into the cable covering.
3. The coating, being water soluble, is dissolved by the ground moisture and seeps into the soil. This provides a treated soil barrier that stops pocket gophers before they reach the cable jacket itself.

In somewhat different formulations it is possible to use such additives as a hydroxalkyl cellulose, e.g., hydroxypropylmethyl cellulose. Other hydroxyalkyl cellulose material can be used. Other alcohols and methylalcohol can be used. Methylalcohol is now preferred because it evaporates readily at ambient temperature.

Formulation 3

In another formulation 3 grams of hydroxypropylmethyl cellulose (Methocel HG), 3 grams of N,N-dimethyl-S-tert-butylsulfenyl dithiocarbamate and 125 ml. of methylalcohol were stirred together. This mixture was applied to Marlex tubing as before to provide a slow release water-soluble coating of rodent repellent.

Formulation 4

| | |
|---|---|
| Dimethylformamide | 125 ml. |
| N,N-dimethyl-S-tert-butyl-sulfenyl dithiocarbamate | 3 g. |
| Methyl cellulose (cellosolve) | 3 g. (25 cps. solution)* |

Formulation 5

| | |
|---|---|
| Dimethylsulfoxide | 125 ml. |
| N,N,-dimethyl-S-tert-butyl-sulfenyl dithiocarbamate | 3 g. |
| Methyl cellulose | 3 g. (25 cps. solution)* |

*Solution 25 centipoise flow rate

The actual test results reported herein show that no damage occurred to the tubing and that the formulations are, therefore effective and can be employed in protecting buried cables.

The repellent will usually be from about 1 to 45 percent by weight of the composition, the solubilizing ingredient, e.g., dimethylsulfoxide, will be in preponderance in the remainder of the composition and the remainder solvent, e.g., polyvinylalcohol will constitute substantially the rest of the composition.

The material or object which can be protected according to the present invention is one which will be buried in the ground and includes electric cables and also any buried rubber of plastic containing material such as conduits, pipes, hoses, barrier sheets, and the like. The term "electric cable" or "cable" is meant to include any rubber or plastic covered wire or conductor, such as electric power cable, seismograph cable, geophone case, telephone cable and the like and, in fact, any rodent damageable material.

In Ser. No. 583,465, filed Sept. 30, 1966, by W. R. Eddy, there is disclosed and claimed a protected article comprising an insulated electrical conduit surrounded by a structurally stable foamed organic polymer of sufficient thickness to protect said insulated electrical conduit, said foam having rodent repellent dispersed therein.

We claim:

1. A rodent-damageable object such as a conduit, a barrier sheet, an electric cable or geophone case, protected against rodent damage when buried in the ground, said object having applied thereto uniformly over substantially its entire surface a layer of a substantially solid moisture-dispersible composition, said composition including a rodent-repellent material and a water-soluble holding substance which in the presence of moisture in the ground permits the dispersal of the repellent material into the ground adjacent to said buried object, said dispersed repellent material forming a rodent barrier in the ground around said buried object.

2. An object according to claim 1 wherein said repellent material is an N,N-dialkylsulfenyl dithiocarbamate.

3. An object according to claim 2 wherein said rodent-repellent material comprises at least one of N,N-dimethyl-S-methylsulfenyl dithiocarbamate and N,N-dimethyl-S-tert-butylsulfenyl dithiocarbamate.

4. An object according to claim 1 wherein the composition which is applied to said object when applied comprises a hydroxyalkyl cellulose and methylalcohol together with said repellent.

5. A method for protecting a rodent-damageable material such as a conduit, a barrier sheet, an electric cable or geophone case, to be buried in the ground which comprises placing uniformly upon the material a layer of a water-dispersible composition, said composition including a rodent repellent and a water-soluble holding substance which in the presence of moisture in the ground permits the dispersal of the repellent into the ground adjacent said material, burying said material in the ground, and permitting ground moisture to remove the composition from the material into the ground in a manner to form a rodent-repellent barrier in the ground surrounding said material.

6. A method according to claim 5 wherein the amount of repellent in the composition on said material is sufficient to provide with the actual moisture in the ground by dispersion of the composition into the ground an effective amount of repellent to provide a rodent-repellent barrier to essentially completely protect said material and the repellent is an N,N-dialkylsulfenyl dithiocarbamate.

7. A method according to claim 5 wherein sufficient moisture is applied to the ground surrounding said material to at least initiate the formation of said barrier.

* * * * *